UNITED STATES PATENT OFFICE.

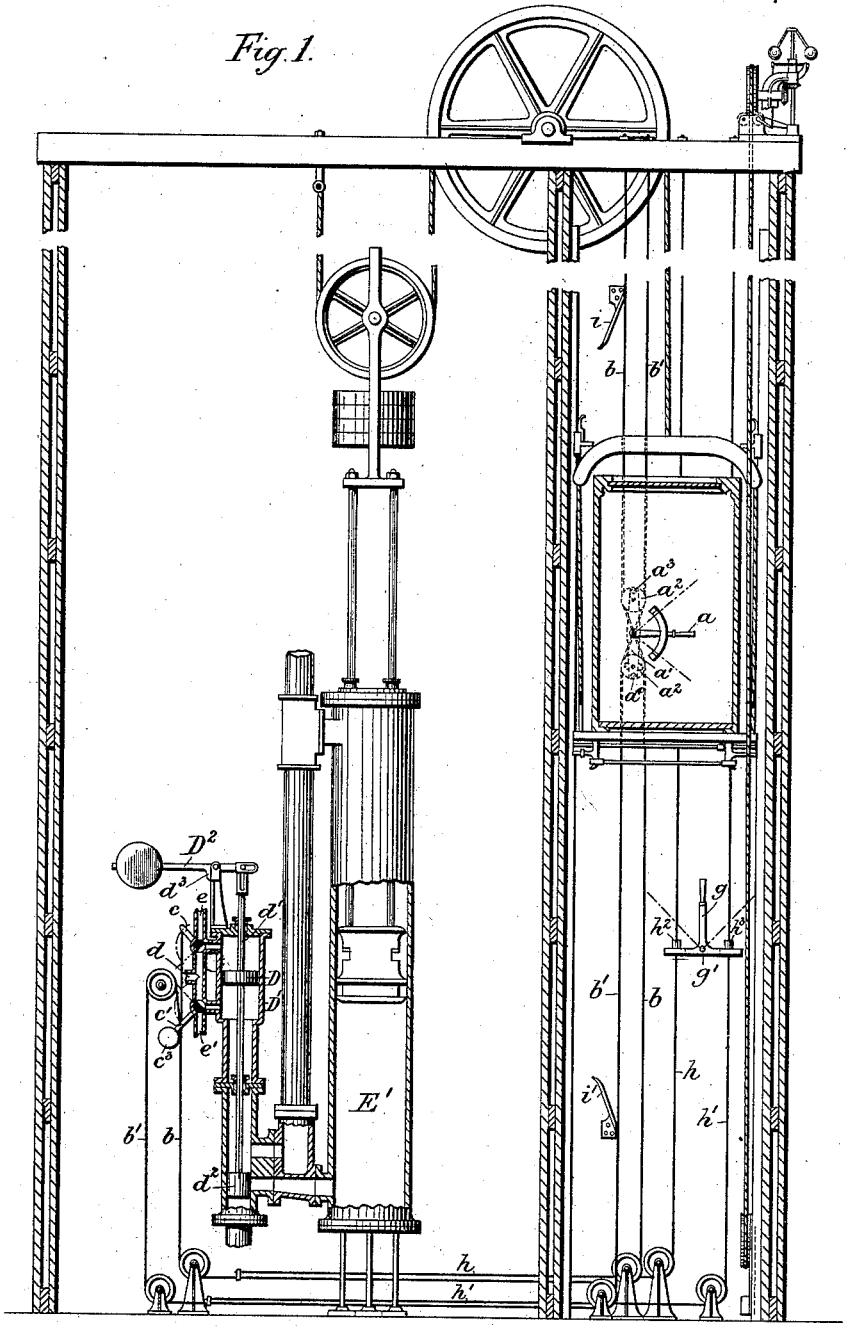

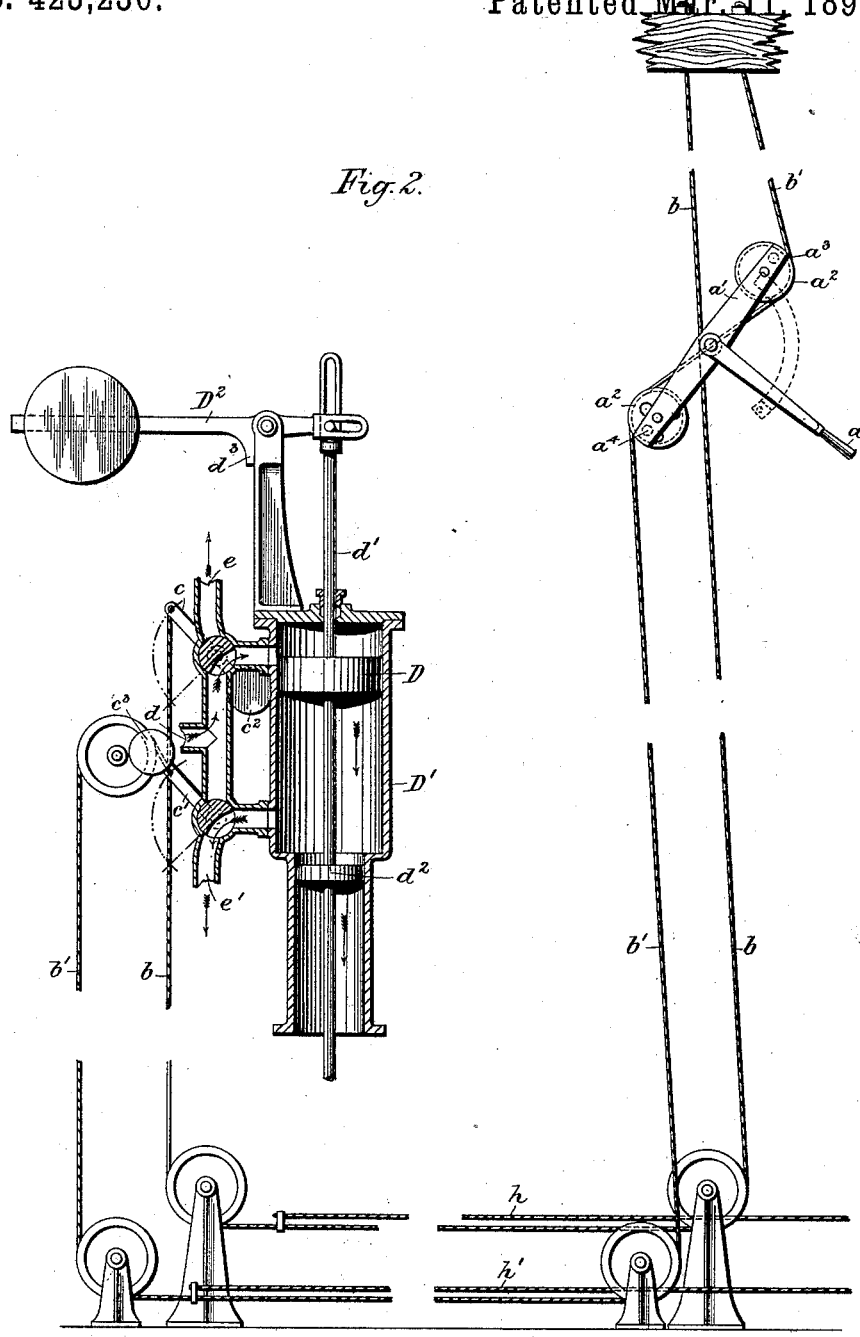

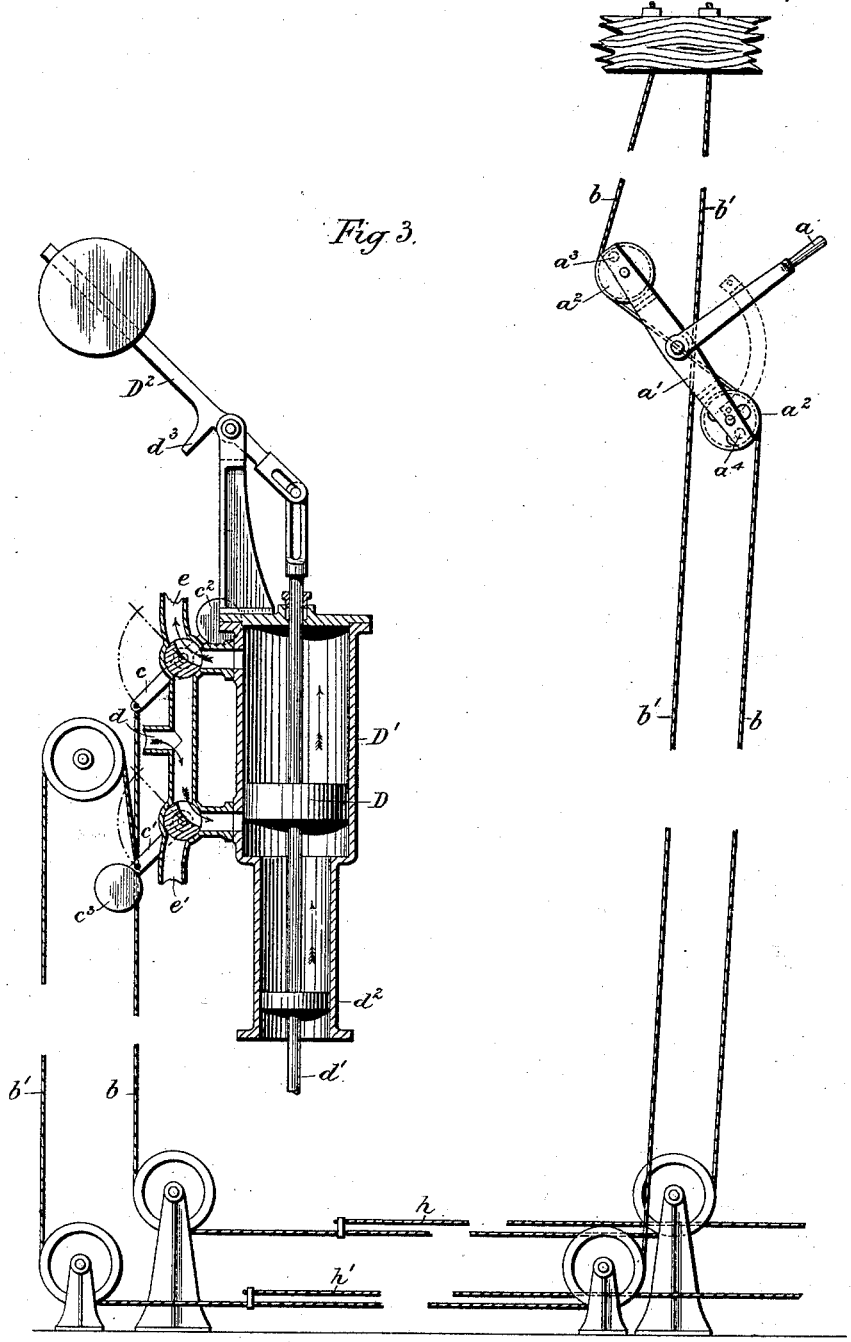

THOMAS POWNALL FORD, OF LONDON, ENGLAND, ASSIGNOR OF ONE-HALF TO WILLIAM AUGUSTUS GIBSON, OF SAME PLACE.

CONTROLLING DEVICE FOR ELEVATORS.

SPECIFICATION forming part of Letters Patent No. 423,236, dated March 11, 1890.

Application filed February 27, 1889. Serial No. 301,312. (No model.)

*To all whom it may concern:*

Be it known that I, THOMAS POWNALL FORD, a citizen of the United States of America, residing at 4 Queen Victoria Street, in the city of London, England, have invented certain new and useful Improvements in or Connected with Elevators or Lifts, of which the following is a specification.

This invention relates more particularly to the class of elevators or lifts which are actuated by hydraulic pressure; but the invention may also be applied to steam or other like pressure apparatus.

The invention consists in the hereinafter-described improvements, whereby the valve governing the main cylinder is actuated and the motion of the cage regulated.

In order that the invention may be clearly understood, reference is made to the accompanying drawings, which form part of this specification, and in which—

Figure 1 is a general elevation, partially in section, of an elevator or lift to which the invention has been applied, the valve-operating mechanism being in its midway or normal position. Fig. 2 is a sectional elevation, on a larger scale, of the valve-operating mechanism when two pistons are employed and when in position to hold the discharge open from the actuating-cylinder; and Fig. 3, a corresponding view when the valve-operating mechanism is in position to hold the said discharge closed.

An operating-handle $a$ is placed in the cage and is connected with a pivoted lever $a'$, carrying two wheels or disks $a^2$ $a^2$, which ride freely on the valve-operating ropes or wires $b$ $b'$, of which there are two, said ropes or wires being secured at the top to the elevated frame-work and crossing between the wheels or disks $a^2$ $a^2$, so that as the handle $a$ is moved both wheels or disks will press upon the one rope or wire $b$ or $b'$, the other being allowed to straighten, and consequently become more or less slack. The normal position of the frame carrying the wheels $a^2$ is such that the axes of the wheels are in a line parallel with the general direction of the ropes $b$ $b'$—that is, the frame is arranged in substantially a vertical position. This arrangement is such that when the frame is shifted into one or the other of the positions indicated in Figs. 2 and 3 one of the ropes is entirely freed or disengaged from the wheels, while the other is pressed thereby. The ropes or wires $b$ $b'$, after passing around suitable guide-pulleys, are attached to separate valves $c$ $c'$, normally in position to leave the pressure open through a common pipe $d$ to both sides of a piston D in a pressure-cylinder D'. The rod or stem $d'$ of said piston passes through a suitable stuffing-box at the top of said cylinder and is slotted, so as to allow for upward play without moving a counterbalance-lever $D^2$, the weight upon which is sufficient, when the pressure upon both sides of the piston D is equal, to raise said piston, its rod $d'$, and a second smaller piston $d^2$, mounted thereon and resting in a smaller part of said cylinder D; or, as shown in Fig. 1, said piston $d^2$ may be the piston or main valve. It will be seen that any movement of the pistons and rod $d'$ will operate the valve governing the inlet or discharge from the main or lifting cylinder E'; but the operation of this valve being well known, description thereof is deemed unnecessary.

The action of the counter-balance $D^2$ is limited by a suitable stop $d^3$ to raising the piston D to the middle of its stroke, in which position it has so operated the valve of the main or lifting cylinder E' as to cause the cage to be held in its then position, as shown in Fig. 1. When the piston D is at the top of its stroke, if the handle $a$ be placed and held in the position shown in Fig. 2, the wheels or disks $a^2$ will draw up the rope or wire $b'$, thus closing valve $c'$ to inlet and opening the discharge from beneath the piston D, or between the pistons D $d^2$, as the case may be, through valve $c'$, the result being that as rope $b$ is not operated the counter-weight $c^2$ (or a spring may be employed) keeps valve $c$ in its normal position or open as between the pressure-pipe $d$ and the top of the piston D, upon the opposite sides of which there will then be an unequal pressure and a consequent movement thereof in the direction of least resistance, as indicated by the arrows, with a corresponding movement of the valve governing the main or lifting cylinder. If the operating-handle $a$ be then released, it will return to its normal position, the relaxed pressure upon the operating rope or wire $b'$ permitting counter-weight $c^3$ to return its connected valve $c'$ to its normal position, closing the discharge $e'$ and opening the pressure-supply from $d$ to beneath the piston D, so that the pressure upon either side of the said piston D is again equalized; but if the piston is at the top of its stroke the extra pressure upon the second or smaller piston $d^2$, open to the same source of supply, will through their common rod $d'$ be sufficient to bring the larger piston to the center of its stroke, as shown in Fig. 1, the excess water beneath piston D circulating through the valves $c'$ $c$ to the top thereof. When the piston D reaches its central position, any further downward movement will be prevented by the counterbalanced lever $D^2$. If, however, instead of releasing the handle $a$, it is held in the position shown in Fig. 2, the excess of pressure upon the top of the piston D will cause it to continue its stroke and raise the counterbalance-lever $D^2$ into the position shown in Fig. 3, when, if the handle $a$ be allowed to return to its normal position, thus leaving the supply open through both valves $c$ $c'$, the pressure upon the opposite sides of D will be equalized, while the effect of the extra pressure upon the top of piston $d^2$, together with the weight of the rod and connected parts, will be overcome by the counter-balance $D^2$, which will raise piston D to the position shown in Fig. 1, the water from above piston D circulating through valves $c$ $c'$ to the under side of the piston. To hasten the action or to cause the piston D to complete its upward stroke, it is only necessary to move and hold the handle in the position indicated in Fig. 3, as this will close the supply to the top of said piston and open it to discharge through pipe $e$. With this construction, should both of the operating ropes or wires break, the action of their valves $c$ $c'$ would automatically cause the cage to be stopped and held in its then position, while if only one should break it would still be possible to move the cage in one direction and stop it when desired, while as a still further security a second set of operating ropes or wires $h$ $h'$ may be placed in the well, provided with an operating-handle $g$ at each floor, so that the motion of the cage may be governed independently of the cage-handle. This arrangement is most completely shown in Fig. 1, where, to avoid confusion in the drawings, a single handle is shown, it being understood that duplicates thereof may be placed at each floor or level, as may be desired. The supplementary valve ropes or wires $h$ $h'$ are shown as connected with ropes or wires $b$ $b'$; but it will be evident that they may be continued to the valves $c$ $c'$, if deemed necessary. The handle $g$ is shown as being pivoted at $g'$ and stops $h^2$ $h^3$ as being placed upon the ropes $h$ $h'$, so that if the said handle be moved to either side, as indicated in dotted lines, there will be a corresponding movement of the valve $e$ or $c'$, as the case may be.

In order that there may be no possible over-travel of the cage, curved or other stops $i$ $i'$ are placed at the top and bottom of the well, so that the operating-handle $a$ will be automatically brought to its normal position by reason of the contact of pins or projections $a^3$ $a^4$ with said stops $i$ $i'$, the result being that piston D will return to its central or normal position and the cage be stopped more or less rapidly, depending upon the rapidity of the action of said piston.

To counterbalance the weights $c^2$ $c^3$, the top wheel or disk $a^2$ may be made slightly heavier than the lower one, thus requiring less pressure on handle $a$ to operate the valves.

It will be understood that in Fig. 1 the invention is shown as applied to the ordinary construction of what are known as the "Standard Elevators," in which a circulating pipe is employed in connection with the main or lifting cylinder, while the double-piston arrangement shown in Figs. 2 and 3 is not only applicable to that type, but may also be used with various forms of valves or taps.

I do not in this application claim the arrangement of valves controlling the supply to the motor-cylinder, nor their connection with operating devices arranged both on the cage and at the landings, as such devices form the subject-matter of another application of mine, Serial No. 290,780, filed November 14, 1888.

I am aware that it is old to mount upon an elevator-cage a frame or lever carrying wheels or pulleys which engage with the suspended valve-operating ropes, which frame is arranged transverse to the general direction of the ropes; but my invention differs from such an arrangement in that the rocking frame is arranged substantially parallel with the general direction of the ropes, whereby it operates in the manner hereinbefore set forth.

What I claim, and desire to secure by Letters Patent, is—

1. The combination, with the cage and controlling device of an elevator, of two suspended ropes connected to operate said device, and a pivoted frame upon the cage provided with a single grooved pulley at each end, between which pulleys both ropes extend and cross each other in position for either to be bent from a vertical line by both of said pulleys as the frame is swung to one side from a substantially vertical position, substantially as set forth.

2. In an elevator, the combination, with the motor-cylinder and its supply-pipe, and two weighted governing-valves controlling the supply of fluid to the said cylinder, of two operating-ropes, one connected with each valve, a pivoted frame carrying wheels or disks between which the ropes are crossed, one of the wheels or disks being heavier than the other to counterbalance the weighted valves, and an operating-handle for the said pivoted frame, substantially as set forth.

3. The combination, in an elevator, of a cage provided with a pivoted frame, operating-handle, and two pulleys, one at each end of the frame, a controlling device having two valves, two operating-ropes connected each with one of the valves of said device, and each suspended and arranged to extend in a straight line vertically between the pulleys when the frame is swung to one side to bend the other rope, substantially as set forth.

In testimony whereof I have hereunto set my hand in the presence of two subscribing witnesses.

THOMAS POWNALL FORD.

Witnesses:
    JAMES BOLES,
    ALLEN P. JONES.